(12) United States Patent
Almalfouh et al.

(10) Patent No.: US 10,973,008 B2
(45) Date of Patent: *Apr. 6, 2021

(54) WIRELESS DEVICE PREFERRED BANDWIDTH PART CONFIGURATION AND DUTY CYCLE INDICATION

(71) Applicant: Apple Inc., Cupertino, CA (US)

(72) Inventors: Sami M. Almalfouh, San Jose, CA (US); Yuchul Kim, Santa Clara, CA (US); Wei Zhang, Santa Clara, CA (US); Tianyan Pu, Cupertino, CA (US); Zhu Ji, San Jose, CA (US); Dawei Zhang, Saratoga, CA (US); Wei Zeng, San Diego, CA (US); Johnson O. Sebeni, Fremont, CA (US); Yang Li, Plano, TX (US)

(73) Assignee: Apple Inc., Cupertino, CA (US)

( * ) Notice: Subject to any disclaimer, the term of this patent is extended or adjusted under 35 U.S.C. 154(b) by 181 days.

This patent is subject to a terminal disclaimer.

(21) Appl. No.: 16/186,350

(22) Filed: Nov. 9, 2018

(65) Prior Publication Data

US 2019/0281598 A1 Sep. 12, 2019

Related U.S. Application Data

(60) Provisional application No. 62/641,505, filed on Mar. 12, 2018.

(51) Int. Cl.
*H04W 76/10* (2018.01)
*H04W 72/04* (2009.01)
(Continued)

(52) U.S. Cl.
CPC ..... *H04W 72/0413* (2013.01); *H04W 72/0446* (2013.01); *H04W 72/0453* (2013.01); *H04W 76/10* (2018.02)

(58) Field of Classification Search
CPC ......... H04W 72/0413; H04W 72/0446; H04W 72/0443; H04W 76/20; H04W 72/0486
See application file for complete search history.

(56) References Cited

U.S. PATENT DOCUMENTS 9,271,234 B2   2/2016   Ljung
2012/0076041 A1   3/2012   Jung
(Continued)

FOREIGN PATENT DOCUMENTS

WO   WO2018085145 A1   5/2018

*Primary Examiner* — Faruk Hamza
*Assistant Examiner* — Abusayeed M Haque
(74) *Attorney, Agent, or Firm* — Kowert, Hood, Munyon, Rankin & Goetzel, P.C.

(57) ABSTRACT

This disclosure relates to techniques for a wireless device to indicate a preferred bandwidth part and duty cycle in a cellular communication system. A wireless device and a cellular base station may establish a radio resource control connection. The wireless device may transmit an indication of a preferred bandwidth part, or a preferred communication duty cycle, or both, to the cellular base station. The cellular base station may select a bandwidth part, or communication duty cycle, or both, based at least in part on the indication provided by the wireless device, and may transmit an indication of the selected bandwidth part, communication duty cycle, or both, to the wireless device. The cellular base station and the wireless device may perform cellular communication using the selected bandwidth part, communication duty cycle, or both.

20 Claims, 7 Drawing Sheets

(51) Int. Cl.
H04W 28/18 (2009.01)
H04W 76/28 (2018.01)

(56) References Cited

U.S. PATENT DOCUMENTS

| | | | |
|---|---|---|---|
| 2013/0114479 A1 | 5/2013 | Seo | |
| 2014/0071904 A1* | 3/2014 | Koo | H04W 52/243 370/329 |
| 2014/0341192 A1* | 11/2014 | Venkob | H04L 1/00 370/336 |
| 2015/0029910 A1* | 1/2015 | He | H04L 5/0094 370/280 |
| 2015/0124671 A1* | 5/2015 | Tabet | H04L 1/1887 370/311 |
| 2015/0170017 A1* | 6/2015 | Murayama | H01Q 1/2225 235/488 |
| 2015/0305056 A1* | 10/2015 | Vangala | H04L 1/1832 455/450 |
| 2016/0227573 A1* | 8/2016 | Quan | H04W 72/1289 |
| 2017/0367116 A1* | 12/2017 | Li | H04W 72/048 |
| 2018/0048413 A1 | 2/2018 | Liu | |
| 2018/0124687 A1* | 5/2018 | Park | H04L 5/0053 |
| 2018/0199343 A1 | 7/2018 | Deogun | |
| 2018/0242319 A1* | 8/2018 | Akkarakaran | H04W 72/042 |
| 2019/0059051 A1* | 2/2019 | Strom | H04W 88/06 |
| 2019/0103954 A1 | 4/2019 | Lee | |
| 2019/0104543 A1 | 4/2019 | Park | |
| 2019/0274093 A1* | 9/2019 | Xiao | H04W 72/1221 |
| 2020/0128459 A1* | 4/2020 | Engstrom | H04W 16/28 |

\* cited by examiner

WIRELESS DEVICE PREFERRED BANDWIDTH PART CONFIGURATION AND DUTY CYCLE INDICATION

PRIORITY INFORMATION

This application claims priority to U.S. provisional patent application Ser. No. 62/641,505, entitled "Wireless Device Preferred Bandwidth Part and Duty Cycle Indication," filed Mar. 12, 2018, which is hereby incorporated by reference in its entirety as though fully and completely set forth herein.

FIELD

The present application relates to wireless communications, and more particularly to systems, apparatuses, and methods for indicating preferred bandwidth parts and communication duty cycles in a cellular communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), BLUETOOTH', etc.

The ever increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus it is very important to also reduce power requirements in UE device designs while allowing the UE device to maintain good transmit and receive abilities for improved communications.

To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

SUMMARY

Some cellular technologies support the use of wideband cells, whose bandwidth can include multiple bandwidth parts, which may have similar or different bandwidths. A wireless device in that cell could be configured with multiple bandwidth parts, of which it may be the case that only one is activated at any given time, per component carrier.

Given such an arrangement, it may be useful to provide a mechanism for the wireless device to request a particular bandwidth part or indicate a preference among its configured bandwidth parts (or possibly among a different bandwidth part set), e.g., based on conditions at the wireless device or based on conditions of the communication link, at any of various times during communication. For example, a wireless device might have different preferences for the bandwidth part configuration of its active bandwidth part at different times, for any of a variety of possible reasons, potentially including but not limited to data type being communicated, thermal conditions at the wireless device, peak power conditions at the wireless device, etc. Note that the parameters encompassed by the bandwidth configuration may include any of a variety of parameters, as described in more detail subsequently herein.

Additionally or alternatively, similarly due to thermal and/or peak power conditions at the wireless device and/or for any of various other possible reasons, it may be useful, at least in some instances, to provide a mechanism for a wireless device to request a particular communication duty cycle or indicate preferred communication duty cycle information, at any of various times during communication. For example, if the wireless device is experiencing thermal and/or peak power conditions such that transmitter and/or receiver duty cycling is being implemented by the wireless device regardless of the uplink and/or downlink scheduling provided by its serving base station, it may be more efficient to both the wireless device and the network for the network to also be aware of such duty cycling constraints when scheduling the wireless device.

Accordingly, embodiments are presented herein of apparatuses, systems, and methods for indicating preferred bandwidth parts and communication duty cycles in a cellular communication system. Such techniques may help wireless devices balance power consumption with throughput and quality of service considerations, as well as improve network resource use efficiency, at least according to some embodiments.

Note that the techniques described herein may be implemented in and/or used with a number of different types of devices, including but not limited to base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Figure 1:
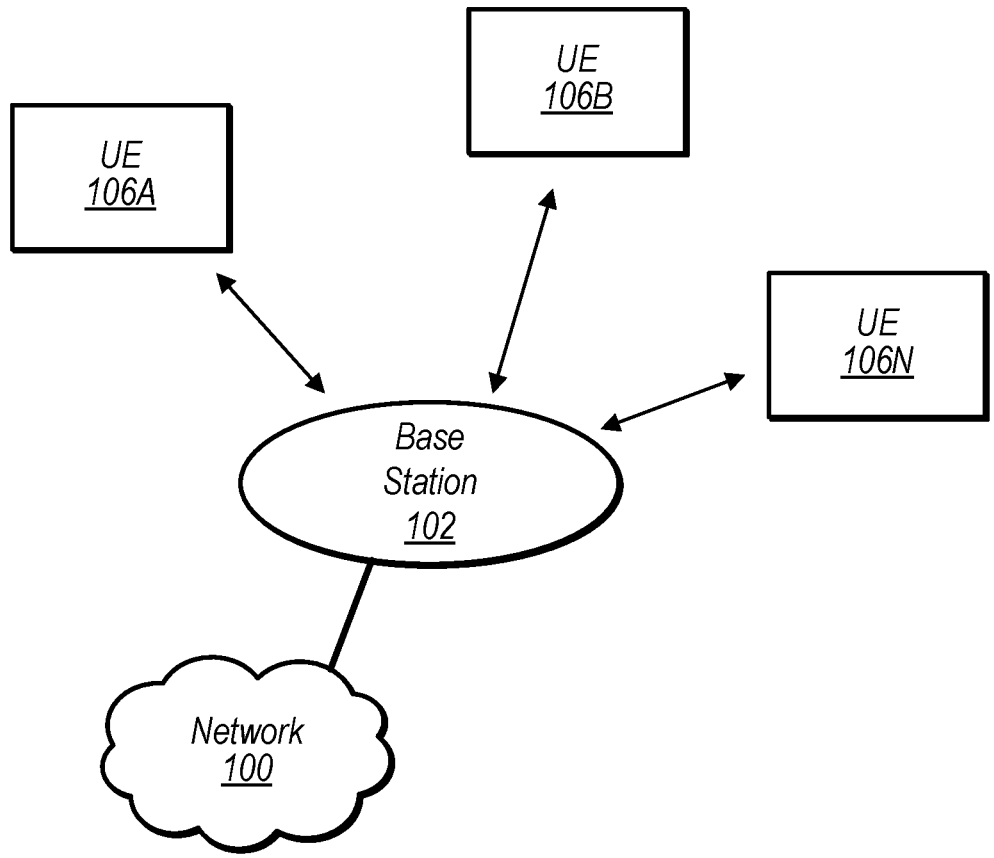
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present dislosure are provided below:

UE: User Equipment
RF: Radio Frequency
BS: Base Station
GSM: Global System for Mobile Communication
UMTS: Universal Mobile Telecommunication System
LTE: Long Term Evolution
NR: New Radio
TX: Transmission/Transmit
RX: Reception/Receive
LAN: Local Area Network
WLAN: Wireless LAN
AP: Access Point
RAT: Radio Access Technology
IEEE: Institute of Electrical and Electronics Engineers
Wi-Fi: Wireless Local Area Network (WLAN) RAT based on the IEEE 802.11 standards

Terms

The following is a glossary of terms that may appear in the present application:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, e.g. in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
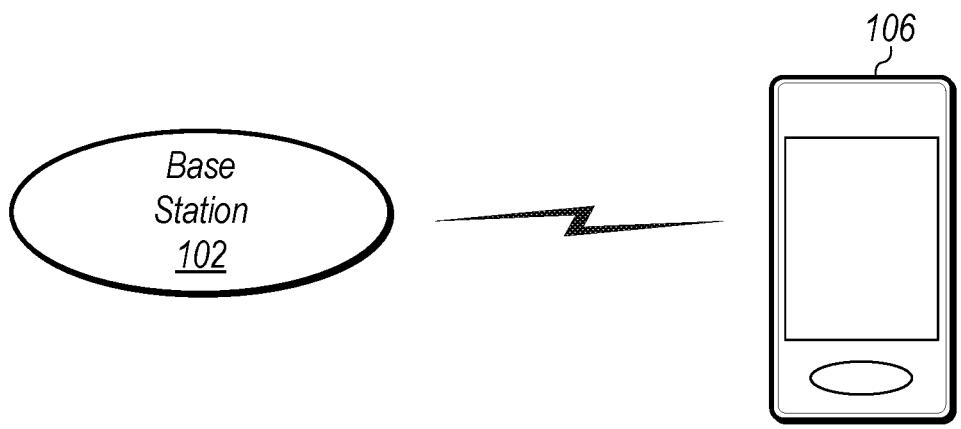
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, WiMAX etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to implement techniques for indicating preferred bandwidth parts and communication duty cycles in a cellular communication system, at least according to the various methods as described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments.

The UE 106 may be a device with wireless network connectivity such as a mobile phone, a handheld device, a wearable device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or NR, or LTE or GSM), and separate radios for communicating using each of Wi-Fi and BLUETOOTH'. Other configurations are also possible.

Figure 3:
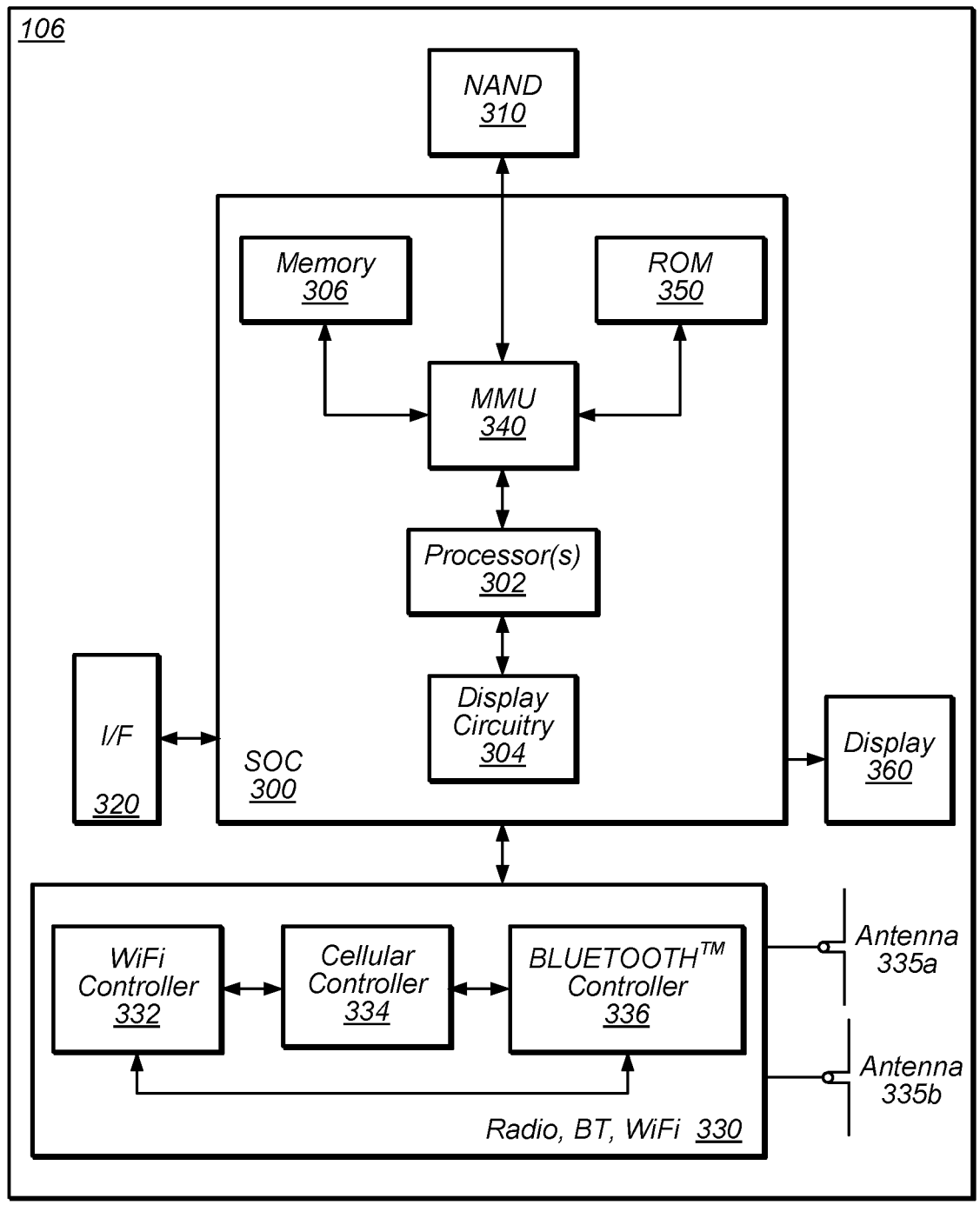
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, GPS, etc.). The UE device 106 may include at least one antenna (e.g., 335a), and possibly multiple antennas (e.g., illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

As described further subsequently herein, the UE 106 (and/or base station 102) may include hardware and software components for implementing methods for at least UE 106 to indicate a preferred bandwidth part and preferred communication duty cycles in a cellular communication system. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to implement such techniques in a cellular communication system according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 332, a cellular controller (e.g. NR controller) 334, and BLUETOOTH' controller 336, and in at least some embodiments, one or more or all of these controllers may be implemented as respective integrated circuits (ICs or chips, for short) in communication with each other and with SOC 300 (and more specifically with processor(s) 302). For example, Wi-Fi controller 332 may communicate with cellular controller 334 over a cell-ISM link or WCI interface, and/or BLUETOOTH' controller 336 may communicate with cellular controller 334 over a cell-ISM link, etc. While three separate controllers are illustrated within radio 330, other embodiments have fewer or more similar controllers for various different RATs that may be implemented in UE device 106.

Figure 4:
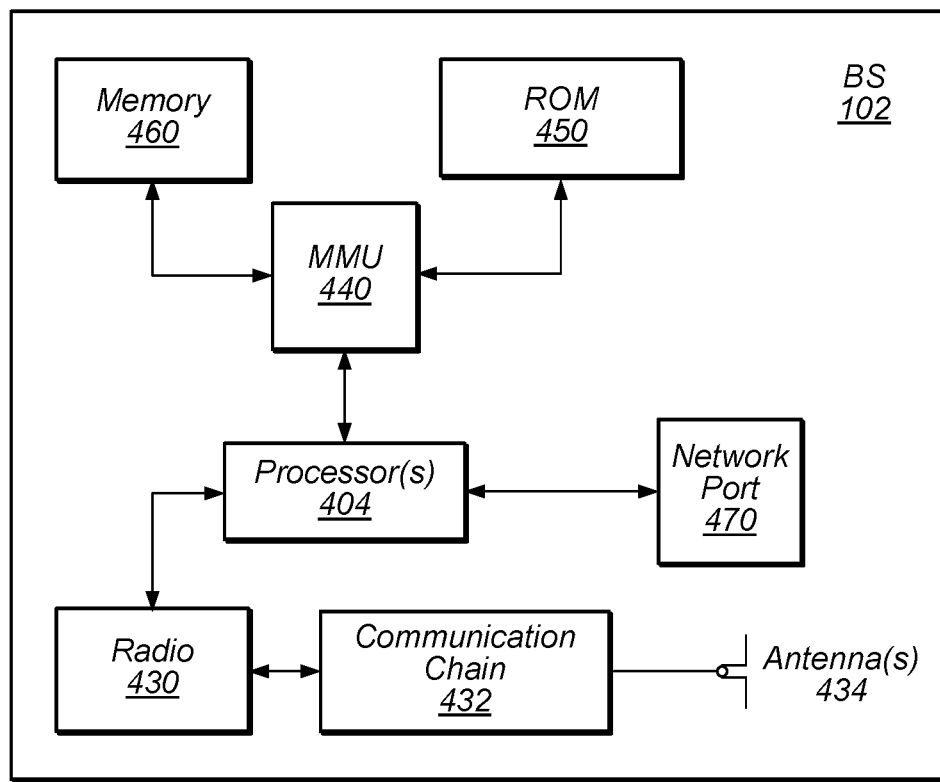
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard. The base station 102 may operate according to the various methods as disclosed herein for wireless devices to indicate preferred bandwidth parts and communication duty cycles in a cellular communication system.

Figure 5:
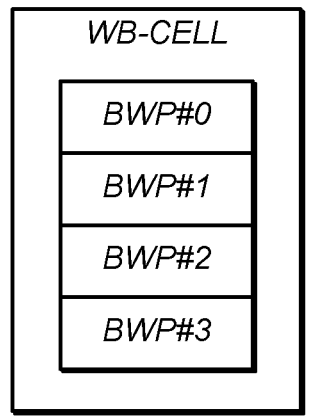
FIG. 5 illustrates aspects of an exemplary possible wideband cell having multiple possible bandwidth parts, according to some embodiments.
Figure 6:
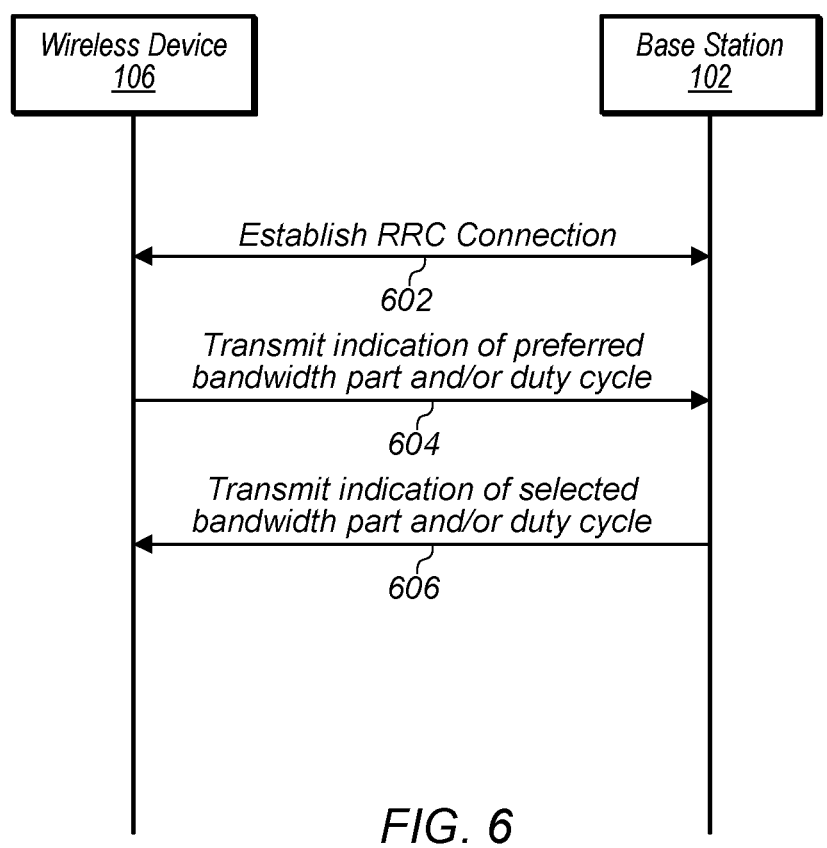
FIG. 6 is a communication flow diagram illustrating an exemplary possible method for indicating preferred bandwidth parts and communication duty cycles in a cellular communication system, according to some embodiments.
Figure 8:
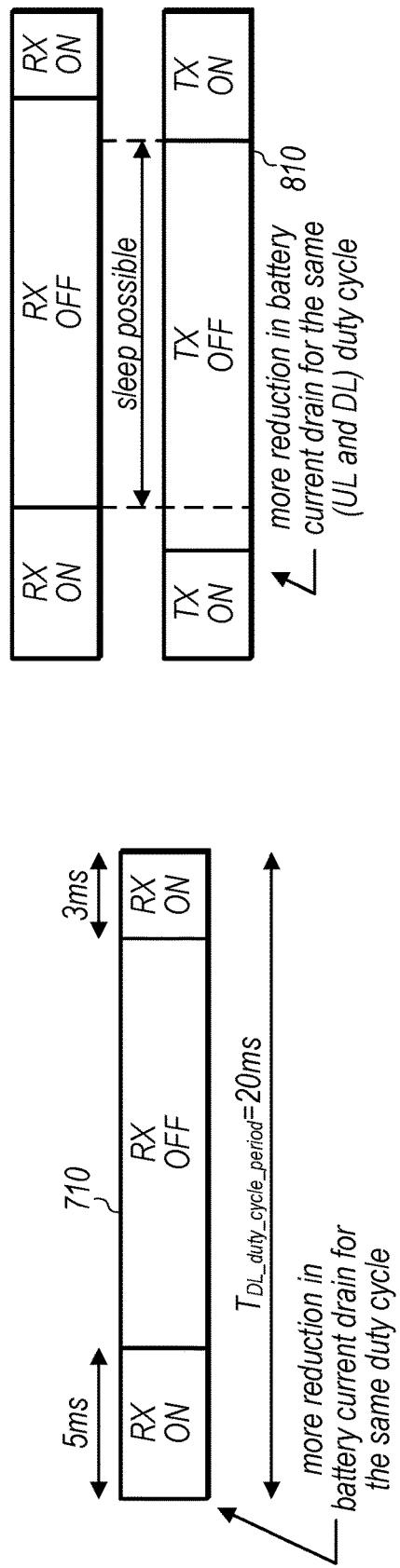
FIGS. 7-13 illustrate various further aspects of possible schemes that could be used for indicating preferred bandwidth parts and/or duty cycles in a cellular communication system, according to some embodiments.
Figure 7:
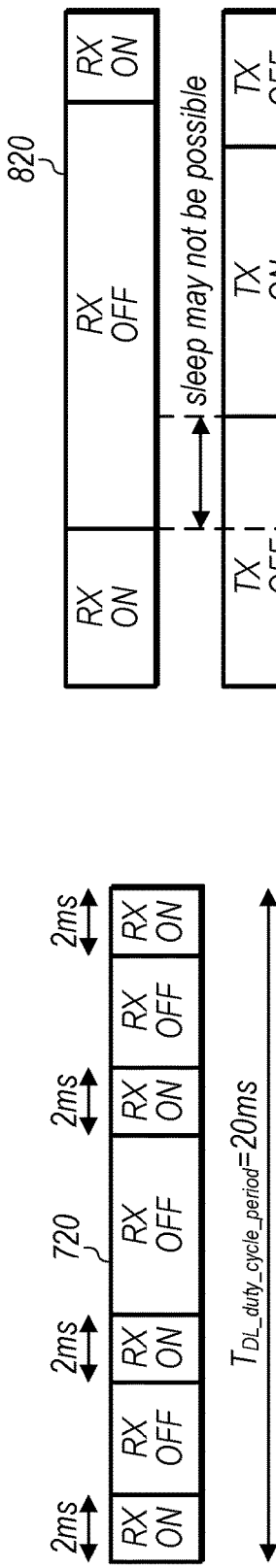

FIGS. 5-6—Preferred Bandwidth Part and Duty Cycle Indications

At least in some cellular communication systems, wideband cells may be provided by a cellular network. A wideband cell may include multiple bandwidth parts, e.g., such that it may be possible for a wireless device to be configured to utilize just a portion of the total cell bandwidth at a given time. FIG. 5 illustrates a possible representation of such a wideband cell including multiple possible bandwidth parts, according to some embodiments. In the illustrated example, the wideband (WB) cell may include four bandwidth parts (BWPs), i.e., BWP #0, BWP #1, BWP #2, and BWP #3. In other scenarios, different configurations (e.g., including a different number of BWPs, and/or any of various other possible differences) may also be possible for a WB (or other) cell. At least in some instances, different BWPs may include different amounts of bandwidth.

In some systems (e.g., at least some 5G NR deployments), it may be the case that a wireless device can only work on one BWP at a time (e.g., per component carrier) for each of uplink and downlink, though multiple BWPs may be configured for a given wireless device. For example, a wireless device may be configured to monitor a downlink control channel and perform data transmission/reception on an activated BWP, but may be configured to not monitor the downlink control channel or perform data transmission/reception on inactive BWPs.

For example, according to 3GPP Release 15, it may be the case that a maximum of 4 BWPs for downlink and a maximum of 4 BWPs for uplink can be configured as a set, with a maximum of 1 downlink BWP and 1 uplink BWP being active at a time, for each of the component carriers (serving cells).

As another possibility, it may be the case that a wireless device can operate on two active uplink BWPs at a time, in at least some instances, for example in the uplink if it is configured with a supplementary uplink (SUL) carrier, such as described in 3GPP TS 38.331 version 15.3.0, p. 156. Other configurations are also possible.

Any of a variety of techniques may be used for switching between active/activated BWPs. Two possible examples may include explicit and implicit activation techniques. When explicitly activating a BWP, signaling may explicitly be provided to a wireless device indicating that a certain BWP is being activated for the wireless device, for example using downlink control information. Implicitly activating a BWP may be based at least in part on a BWP inactivity timer. In such a case, a wireless device may be configured to have a default BWP, and may start the BWP inactivity timer when switching to a non-default BWP. Upon timer expiry, the wireless device may fallback to the default BWP, thus implicitly activating the default BWP. At least in some instances, it may be the case that the BWP inactivity timer can be restarted (e.g., extending the duration for which the non-default BWP is activated) when a successfully decoded downlink control information communication scheduling downlink data is received by the wireless device, and/or under one or more other conditions.

Allowing a wireless device to work on a bandwidth smaller than the entire cell bandwidth using such techniques may be beneficial, at least in some instances, for example with respect to wireless device power consumption, improving support for wireless devices that have lower bandwidth capabilities, and/or for providing interference mitigation qualities, among various possibilities.

In some scenarios, it can be useful for a wireless device to indicate to its serving cellular base station (e.g., gNB) which BWP is preferred by the wireless device. For example, based on wireless device knowledge of data size and application type (e.g., VoLTE call, messaging application, music streaming, large file transfer, etc.), the wireless device may be able to request a BWP or indicate a preferred BWP to the base station, e.g., either during an active connection with the base station or at the time of a new connection setup with the base station. This may help the wireless device to balance power consumption with throughput and QoS requirements by different application types.

Further, when a wireless device is operating in a thermal mode (e.g., to mitigate thermal/overheating conditions) or a peak power mode (e.g., to avoid operating at voltage levels that could cause a battery voltage brownout or forced system shutdown), it may be helpful for the wireless device to be able to request or indicate a preferred BWP with a relatively small bandwidth, e.g., in order to limit the battery current drain during a window of time during which the wireless device is operating under peak-power or thermal constraints. For example, use of such a smaller bandwidth may result in reduced power consumption by the baseband modem processing unit of a wireless device, e.g., due to decreased processing load from a lower sampling rate for the smaller bandwidth.

Further, when a wireless device is operating under peak-power and/or thermal constraints, it may be important to utilize additional techniques to limit the battery current drain. For example, a wireless device may duty-cycle its transmitter and/or receiver circuitries (among other mechanisms, such as limiting transmit power). Implementing an uplink or downlink maximum duty cycle, respectively, may include limiting the proportion of time for which a wireless device operates its transmitter or receiver circuitry, respectively, in a powered on state, to at most a configured maximum. To achieve this, a wireless device may power off the transmitter and/or receiver circuitry (e.g., as applicable in view of the duty cycling configuration) for a sufficient duration of time (which may be referred to as a blanking period, in some instances) out of a certain time period (which may be referred to as a duty cycle period) such that the proportion of time that the transmitter and/or receiver circuitry is powered on over the duty cycle period is less than the configured maximum. Such techniques may reduce the power consumption of a wireless device over a period of time, which may allow for peak power and/or thermal conditions to subside. If the wireless device does not implement peak-power or thermal mitigations at appropriate times, it may be the case that unexpected system behavior can occur, such as a battery voltage brownout or a forced system shutdown, e.g., to protect device components from damage.

It may be advantageous, at least in some instances, for both a wireless device implementing such duty-cycling and for its serving cell to be aware of the duty cycle requirements and blanking periods (e.g., periods in which the wireless device may turn off its transmitter and/or receiver circuitries) used by the wireless device to reduce its battery current drain. For example, network resources (such as downlink or uplink grants) that are provided but not used by a wireless device due to duty cycling would be wasted, and new resources would need to be assigned to the wireless device for retransmissions to recover the information lost or not transmitted during blanking periods. From the device perspective, the wireless device may still have to transmit (or retransmit) data and control information for any missed transmissions during a blanking period, and would also need to process retransmissions from the network for information that was sent during the wireless device receiver blanking periods.

In some instances, peak-power and thermal constraints may be more common for some wireless communication technologies than others. For example, as new and potentially increasingly complex wireless communication technologies and techniques are developed, there may be potential for increased baseband modem processor, RF front-end, and/or other components to require more battery current draw to implement those wireless communication technologies and techniques. As one such possibility, 5G NR communication in millimeter wave communication bands may be considered relatively computationally and/or otherwise complex, e.g., relative to LTE communication in lower frequency bands.

Accordingly, it may be useful to support capabilities for a wireless device to request or indicate its preference for a maximum communication duty cycle for either or both of downlink and uplink. The serving base station for the wireless device may then be able to adjust its scheduling for the wireless device in accordance with the indicated preferred duty cycle, potentially such that there are scheduling gaps allowing the wireless device a time period where it can shut down its transmitter circuit and/or its receiver circuit without missing scheduled communications with the cellular base station. For example, a network may be able to translate a wireless device's requested downlink duty cycle to a physical downlink control channel (PDCCH) monitoring periodicity, or Slot Format Indicator (SFI). As another possibility, a wireless device could indicate or request a specific PDCCH monitoring periodicity/pattern that would result in (e.g., that maps to) its preferred duty cycle configuration.

Note also that as part of such capabilities, it may also be supported that a wireless device can indicate a time-period over which the duty cycle is to be calculated. For example, peak power constraints may in some instances have a shorter time constant compared to thermal constraints, such that for peak power mitigation, it may be important to achieve a given duty cycle over a shorter time scale than for thermal mitigation.

Accordingly, FIG. 6 is a flowchart diagram illustrating a method for a wireless device (e.g., a wireless user equipment (UE) device) to indicate a preferred bandwidth part and/or preferred communication duty cycles in a cellular communication system.

Aspects of the method of FIG. 6 may be implemented by a wireless device, e.g., in conjunction with a cellular base station, such as a UE 106 and a BS 102 illustrated in and described with respect to various of the Figures herein, or more generally in conjunction with any of the computer systems or devices shown in the above Figures, among other devices, as desired. Note that while at least some elements of the method of FIG. 6 are described in a manner relating to the use of communication techniques and/or features associated with NR and/or 3GPP specification documents, such description is not intended to be limiting to the disclosure, and aspects of the method of FIG. 6 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 6 may operate as follows.

In 602, the wireless device and the cellular base station may establish a wireless link. According to some embodiments, the wireless link may include a cellular link according to 5G NR. For example, the wireless device may establish a session with an AMF entity of the cellular network by way of a gNB that provides radio access to the cellular network. Note that the cellular network may also or alternatively operate according to another cellular communication technology (e.g., LTE, UMTS, CDMA2000, GSM, etc.), according to various embodiments.

Establishing the wireless link may include establishing a RRC connection with a serving cellular base station, at least according to some embodiments. Establishing the RRC connection may include configuring various parameters for communication between the wireless device and the cellular base station, establishing context information for the wireless device, and/or any of various other possible features, e.g., relating to establishing an air interface for the wireless device to perform cellular communication with a cellular network associated with the cellular base station. After establishing the RRC connection, the wireless device may operate in a RRC connected state.

According to some embodiments, during RRC connection establishment, the cellular base station may provide an indication of a set of possible communication duty cycle values, and potentially also a set of possible communication duty cycle period values, that can be used by the cellular base station when communicating with the wireless device. Alternatively, such information could be provided in broadcast system information, or may not be provided by the cellular base station. For example, it may be the case that possible communication duty cycle values and/or possible communication duty cycle period values are pre-agreed between the wireless device and the cellular base station, e.g., based on proprietary agreements and/or because such values are specified in cellular communication standards documents for a cellular communication technology according to which the wireless device and the cellular base station are communicating.

In 604, the wireless device may transmit a request for a specific bandwidth part configuration/an indication of a preferred bandwidth part configuration and/or a preferred communication duty cycle, and possibly also a preferred communication duty cycle period, for the RRC connection to the base station, which may receive the indication.

Note that the bandwidth part configuration could encompass any of a variety of possible parameters, potentially including but not limited to bandwidth (e.g., potentially including a set of preferred bandwidth sizes), BWP location (e.g., potentially including a set of starting and/or ending resource block (RB) indices), BWP inactivity timer length, subcarrier spacing, physical downlink shared channel (PDSCH) configuration (e.g., in the case of a DL BWP) and its associated parameters (e.g., maxNrofCodeWordsScheduledByDCI, maximum number of MIMO layers, etc.), physical downlink control channel (PDCCH) configuration (e.g., again in the case of a DL BWP) and its associated parameters (e.g., searchSpacesToAddModList, search space periodicity, etc.), physical uplink control channel (PUCCH) configuration (e.g., in the case of an UL BWP) and its associated parameters, physical uplink shared channel (PUSCH) configuration (e.g., again in the case of an UL BWP) and its associated parameters, etc.

Note also that if a preferred communication duty cycle period is indicated, it may be indicated in conjunction with an indication of a preferred duty cycle, at least according to some embodiments. At least in some instances, it may be possible for an indication of a preferred duty cycle to be provided by the wireless device without also providing an indication of a preferred communication duty cycle period.

Note that one or more of the preferred bandwidth part configuration, communication duty cycle, and/or communication duty cycle period may be selected by the wireless device from possible values for such parameters specified by the cellular base station during RRC configuration, or as part of broadcast system information, or as specified by cellular communication standards documents, among various possibilities. Alternatively, one or more of the preferred bandwidth part, communication duty cycle, and/or communication duty cycle period may be selected by the wireless device without constraints to the set of possible parameter values that can be indicated.

The base station may select a bandwidth part configuration and/or a communication duty cycle, and possibly also a communication duty cycle period, for the RRC connection based at least in part on the request/indication received from the wireless device. As previously noted, the bandwidth part configuration may include any of a variety of possible parameters, potentially including bandwidth, BWP location, subcarrier spacing, various channel configuration parameters for the BWP, etc.

It should be noted that if a communication duty cycle period is selected by the base station for the RRC connection, it may be selected in conjunction with a communication duty cycle value. Alternatively, a (e.g., default) communication duty cycle period for any duty cycling configurations may be predetermined (e.g., specified in standard specification documents, or otherwise pre-agreed upon/known a priori by both the wireless device and the base station), in some instances, such that the wireless device may not have provided an indication of a preferred communication duty cycle period and the base station may thus select the communication duty cycle period for the wireless device in a manner that is not based on any such indication. As previously noted, in some instances selecting the communication duty cycle may include selecting a PDCCH monitoring periodicity that would achieve the selected communication duty cycle.

In 606, the base station may transmit an indication of the selected bandwidth part configuration and/or communication duty cycle, and possibly a communication duty cycle period, to the wireless device, which may receive the indication. The base station and the wireless device may perform cellular communication using the bandwidth part configuration, communication duty cycle, and/or communication duty cycle period selected and indicated by the base station. As previously noted, at least in some instances, it may be the case that a communication duty cycle period is indicated by the cellular base station only in conjunction with an indication of a communication duty cycle (e.g., it may be the case that a communication duty cycle period is not meaningful if not used in conjunction with a duty cycle). However, it should also be noted that an indication of a communication duty cycle could be provided without also providing an indication of a communication duty cycle period, at least in some instances. For example, a default communication duty cycle period could be used if no communication duty cycle period is specifically signaled, or an indication of a communication duty cycle period to be used by the wireless device when duty cycling could be provided by the base station at a different time, such as in broadcast cell system information, or during a different portion of RRC connection configuration, among various possibilities.

Note that an indication of a preferred communication duty cycle and a preferred communication duty cycle period may be provided by the wireless device for either or both of uplink and downlink communication. The indicated preferred communication duty cycle and communication duty cycle period for uplink and downlink can be the same or different, e.g., in various scenarios. Similarly, the cellular base station may indicate a selected communication duty cycle and a selected communication duty cycle period for either or both of uplink and downlink communication, e.g., in response to the indication(s) by the wireless device.

In some instances, an indication of a preferred bandwidth part configuration, a preferred communication duty cycle, and/or a preferred communication duty cycle period may be provided by the wireless device for any or all active component carriers configured for the wireless device by the cellular base station. In such a scenario, the cellular base station may indicate selected communication duty cycle (and possibly communication duty cycle period) information on a per component carrier basis, e.g., in response to the indication(s) by the wireless device.

In some instances, the wireless device may provide an indication of a preferred minimum time period for a contiguous gap with no downlink or uplink scheduling during each communication duty cycle period. The cellular base station may consider such an indication when scheduling uplink and downlink communications for the wireless device, e.g., such as to attempt to provide the requested minimum time period for a contiguous gap with no downlink or uplink scheduling for the wireless device in each communication duty cycle period (e.g., while potentially also considering other scheduling constraints).

In some instances, the preferred bandwidth part configuration, the preferred communication duty cycle, and/or the preferred communication duty cycle period may be selected by the wireless device based at least in part on detecting that a thermal condition and/or a peak power condition is occurring at the wireless device. For example, the wireless device may determine that a thermal condition and/or a peak power condition is occurring at the wireless device, may determine values for the preferred bandwidth part configuration, the preferred communication duty cycle, and/or the preferred communication duty cycle period that may help mitigate the condition(s) being experienced by the wireless device, and may accordingly provide the indication of the preferred bandwidth part configuration, the preferred communication duty cycle, and/or the preferred communication duty cycle period to the cellular base station.

In such a case, if the wireless device determines (e.g., at a later time) that the thermal condition and/or peak power condition is no longer occurring at the wireless device, the wireless device may provide an indication of an updated preferred bandwidth part configuration, an updated preferred communication duty cycle, and/or an updated preferred communication duty cycle period to the cellular base station (e.g., based at least in part on determining that the thermal condition or peak power condition is no longer occurring at the wireless device). For example, the wireless device may request to resume use of a default bandwidth part, communication duty cycle, and/or communication duty cycle period, once a detected thermal condition or peak power condition is no longer occurring at the wireless device. Alternatively, the wireless device may indicate that the wireless device no longer has a preferred bandwidth part, communication duty cycle, and/or communication duty cycle period, once a detected thermal condition or peak power condition is no longer occurring at the wireless device. Such a technique may be used, for example, if bandwidth part and/or duty cycle configurations are considered valid indefinitely (e.g., until renegotiated or the RRC connection is released), according to some embodiments.

Alternatively (or in addition), the wireless device may determine to request a different bandwidth part configuration, communication duty cycle and/or communication duty cycle period at any of various times during communication with the cellular base station and for any of a variety of reasons. The cellular base station may select a new bandwidth part configuration, communication duty cycle, and/or communication duty cycle period, in response to the indication of the updated preferred bandwidth part, updated preferred communication duty cycle, and/or updated preferred communication duty cycle period, and may provide configuration information indicating such information to the wireless device.

Alternatively (or in addition), in some instances, the selected bandwidth part configuration, communication duty cycle, and/or communication duty cycle period may be configured to expire after expiration of a timer associated with the selected bandwidth part configuration, communication duty cycle, and/or communication duty cycle period. Such a timer could also be restarted or otherwise extended in response to certain triggers (e.g., certain data communication events, an indication from the wireless device to continue using the selected bandwidth part, communication duty cycle, and/or communication duty cycle period, etc.), if desired. After expiration of the timer associated with the selected bandwidth part configuration, communication duty cycle, and/or communication duty cycle period, the wireless device and the cellular base station may communicate using a default bandwidth part configuration, communication duty cycle, and/or communication duty cycle period for the RRC connection.

FIGS. 7-13—Further Preferred Bandwidth Part Configuration and Duty Cycles Indications Information FIGS. 7-13 illustrate various aspects of possible schemes that could be used for indicating preferred bandwidth parts and/or duty cycles in a cellular communication system, according to some embodiments. Note that FIGS. 7-13 and the following information are provided as being illustrative of further considerations and possible implementation details relating to the method of FIG. 6, and are not intended to be limiting to the disclosure as a whole. Numerous variations and alternatives to the details provided herein below are possible and should be considered within the scope of the disclosure.

At least in some instances, it may be possible for downlink and uplink duty cycles to be configured separately. For example, it may be possible to define the downlink duty cycle as the ratio of the duration during which a wireless device receiver is powered on (which may be referred to as "$T_{RX\_ON}$") (to receive control signaling and/or data) to the duty cycle calculation period (which may be referred to as "$T_{DL\_duty\_cycle\_period}$"):

DL_duty_cycle %=100*($T_{RX\_ON}/T_{DL\_duty\_cycle\_period}$)

Similarly, it may be possible to define the uplink duty cycle as the ratio of the duration during which a wireless device transmitter is powered on (which may be referred to as "$T_{TX\_ON}$") (to transmit control signaling and/or data) to the duty cycle calculation period (which may be referred to as "$T_{UL\_duty\_cycle\_period}$"):

UL_duty_cycle %=100*($T_{TX\_ON}/T_{UL\_duty\_cycle\_period}$)

The duty cycle period (DL or UL) can be in units of slot (e.g., $T_{duty\_cycle\_period}$=1 ms for subcarrier spacing of 15 KHz, as one possibility) or multiple slots (e.g., $T_{duty\_cycle\_period}$=5 ms for subcarrier spacing of 15 KHz, as one possibility), potentially even including fractional numbers of slots (e.g., 2 slots and 2 OFDM symbols, etc.).

Note that, from the perspective of the wireless device, it may be more effective at reducing battery drain over the duty cycle period if the opportunities for the wireless device to turn off its receiver or transmitter circuits are relatively more contiguous in time. For example, there may be timing overhead associated with turning transmitter and receiver circuitries off and back on again. For example, consider the possible receiver use patterns illustrated in FIG. 7. In the upper illustrated receiver use pattern 710, there may be a single RX OFF operating window between two RX ON operating windows, while in the lower illustrated receiver use pattern 720, there may be a multiple RX OFF and RX ON operating windows. Since each RX ON window may require some ramp up and/or ramp down to power components on then eventually off again, there may be more reduction in battery current drain in the case of the upper illustrated receiver use pattern 710 than for the lower illustrated receiver use pattern 720 for the same duty cycle.

Note additionally that (at least when using frequency division duplexing or FDD communication techniques), it may be more beneficial to the wireless device to align the opportunities for both the transmitter and receiver to be turned off such that they overlap in time than if they are staggered in time, as this may allow the wireless device to enter further reduced battery drain modes (e.g., potentially including baseband processor sleep). For example, consider the possible RX and TX use patterns illustrated in FIG. 8. In the upper illustrated use pattern 810, the RX OFF and TX OFF operating windows may be substantially overlapping, such that it may be possible for the baseband processor to effectively sleep for at least a portion of that time. In the lower illustrated use pattern 820, the RX OFF and TX OFF operating windows may be substantially staggered, such that it may not be possible for the baseband processor to effectively sleep (e.g., since there may not be a sufficiently long window of time in which it is not used for either RX or TX. As a result, there may be more reduction in battery current drain in the case of the upper illustrated use pattern 810 than for the lower illustrated use pattern 820 for the same UL and DL duty cycles.

There may be numerous possible ways for a wireless device and a cellular base station to negotiate duty cycles and schedule communications in accordance with a selected duty cycle. As one possibility, a cellular base station may be able to choose to control the DL and UL duty cycles dynamically through slot format indications (e.g., using slot formats defined in 3GPP TS 38.211, Table 4.3.2-3, as one possibility). As another possibility, UL-DL-Configuration-Common (and UL-DL-Configuration-Dedicated) signaling can be used, e.g., in which the "flexible" symbols (e.g., marked with "X") are considered to be muted (unused) for a specific wireless device for which the base station is intending to control its DL and/or UL duty cycle.

Figure 9:
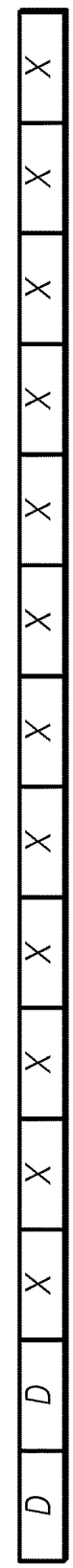

For example, to achieve a DL duty cycle of a wireless device of up to 20% over a 1 ms duration, a gNB operating according to 5G NR could assign an intended UE a slot format as illustrated in FIG. 9 (e.g., with the gNB interpreting symbols marked with "X" as muted (unused) instead of being "flexible", such that the gNB may not assign any DCI grants (or PDCCH) monitoring in the slots marked as "X".

Figure 10:
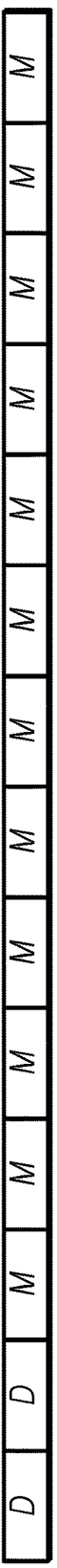

If desired, any number of other formats can also or alternatively be used to control DL and UL duty cycles. Such formats may include other already defined formats and/or new formats defined using reserved entries of the previously referenced slot format table. For example, one or more slot formats that explicitly indicate certain symbols as being muted could be defined. FIG. 10 illustrates such a possible slot format that may otherwise be comparable to the slot format illustrated in FIG. 9.

Further, if a wireless device indicates a time period ($T_{duty\_cycle\_period}$) that is longer than a one slot duration, the gNB could choose to concatenate different slots with the same or different slot formats to achieve a requested duty-cycle over a longer $T_{duty\_cycle\_period}$. Note that while doing so, the gNB may still attempt to maximize the amount of time that transmitter and receiver circuitry can be contiguously powered off or otherwise operated in a reduced power mode, and/or to align the opportunities for transmitter and receiver circuitry to be powered off with each other, as previously discussed herein.

Figure 11:
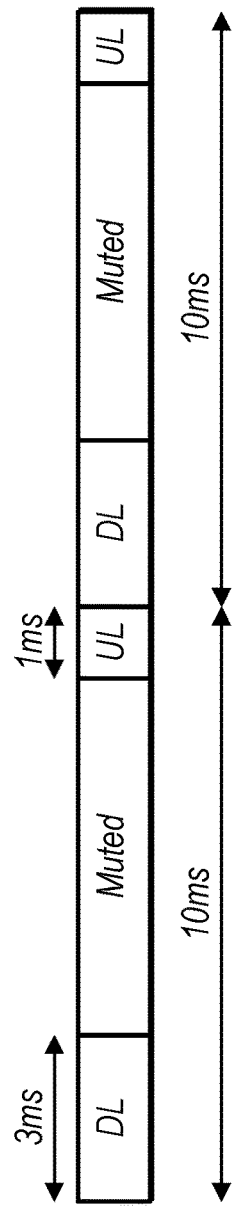

For longer values of $T_{duty\_cycle\_period}$, or otherwise as desired, it may also be possible to utilize UL-DL-Configuration signaling with muted slots/symbols on a potentially longer timescale. For example, a UL-DL-Configuration-Common message (with UL-DL-Configuration-Dedicated overriding flexible periods to "muted" periods for a UE for which the uplink and/or downlink duty cycle is being controlled) may be used. FIG. 11 illustrates a schedule that could be configured in such a way, e.g., in which the $T_{duty\_cycle\_period}$ is 10 ms, the DL duty cycle is 30%, and the UL duty cycle is 10%.

Thus, it may be possible for a wireless device to indicate a preferred BWP (or more generally a preferred BWP configuration) from a set of configured BWPs (or BWP configurations), for the DL or UL or both, per active component carrier (e.g., in case of carrier aggregation). For each active carrier, the wireless device may also be able to indicate a maximum downlink duty cycle, and a maximum uplink duty cycle (e.g., if the component carrier supports uplink transmissions). The duty cycle indication can be indicated by the wireless device as an index in a quantized set of duty cycle values (e.g., {0%, up to 20%, up to 40%, up to 60%, up to 100%}, as one possibility; any of various other sets are also possible). This set can be pre-configured by the base station (e.g., by the gNB).

In addition to a duty cycle value, the wireless device may also indicate to the base station a duty cycle period ($T_{duty\_cycle\_period}$) over which the duty cycle is to be determined. This time period can be different for the downlink and uplink, and can be different for different component carriers (e.g., in the case of carrier aggregation).

The wireless device may also indicate to the base station a minimum time period ("$T_{no\_scheduling}$") for a contiguous gap of no DL or UL scheduling, within the duty cycle period. Note that the smallest of the DL duty cycle period or the UL duty cycle period may be used for this purpose, if the DL and UL duty cycle periods are different. This mechanism may help allow the wireless device to obtain a long enough gap for baseband processor sleep, which may in turn provide more and/or faster reduction in battery current drain, and thus potentially faster alleviation of peak-power and/or thermal constraints.

Such time periods (e.g., $T_{duty\_cycle\_period}$ and/or $T_{no\_scheduling}$) can also be indicated as an index in a set of values that is pre-configured by the base station, in some instances. For example, $T_{duty\_cycle\_period}$ could be chosen from a set of values {10 ms, 20 ms, 50 ms, 100 ms, 200 ms, 500 ms, 1000 ms}, as one possibility; any of various other sets are also possible. As another example, $T_{no\_scheduling}$ could be chosen from a set of values {2 ms, 5 ms, 10 ms, 20 ms, 40 ms}, as one possibility; again, any number of other sets are also possible. Note that the values requested by a wireless device and selected by a base station for such parameters may be chosen in combination such as to be possible to obtain; for example, at least in some instances, a wireless device may generally avoid requesting a value of $T_{no\_scheduling}$ that is larger than the value of $T_{duty\_cycle\_period}$ requested by the wireless device.

Figure 12:
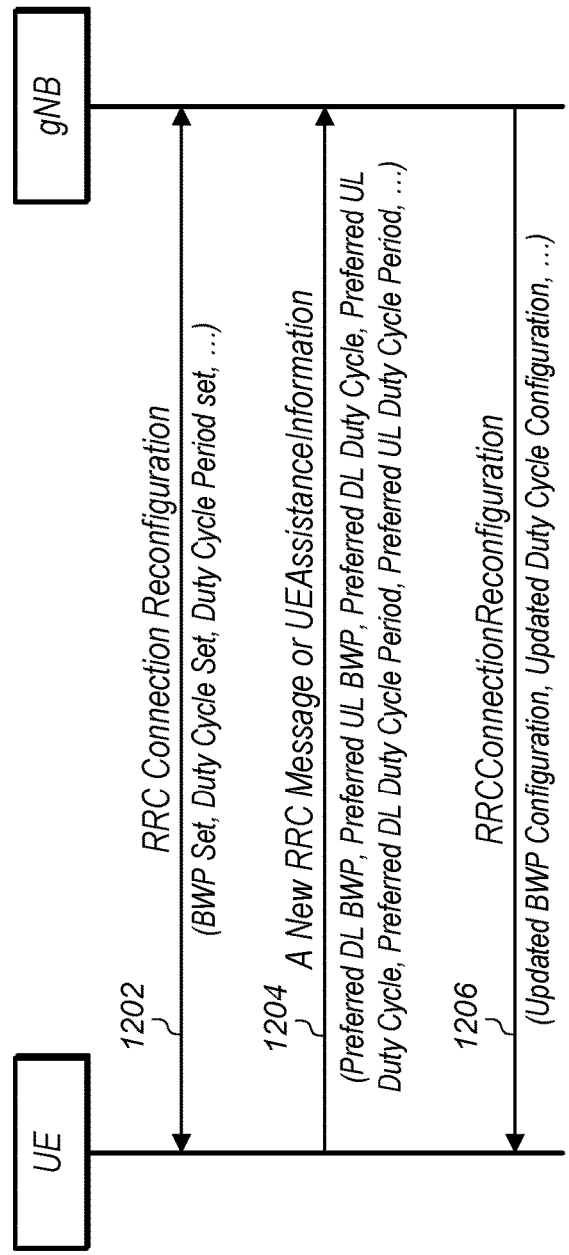

According to various embodiments, a wireless device may be able to send its preferred BWP configuration and duty cycle configuration indication(s) to its serving base station through a media access control (MAC) control element (CE) (e.g., in conjunction with a random access channel (RACH) procedure to establish a RRC connection, as one possibility), or through RRC signaling, among various possibilities. FIG. 12 illustrates a signaling flow between a UE and a gNB that utilizes such a RRC signaling based approach.

As shown, in 1202, during RRC connection configuration/reconfiguration, the gNB may provide information indicating a BWP (or BWP configuration) set, duty cycle set, and duty cycle period set, among various possible information, to the UE.

In 1204, the UE may provide an indication of its preferred BWP (or BWP configuration), duty cycle, and duty cycle period, for each of downlink and uplink, to the gNB. The indication may be provided using a UEAssistanceInformation RRC message, a new RRC message, or any of various other possible signaling options.

In 1206, the gNB may provide a RRCConnectionReconfiguration message, which may indicate updated BWP configuration and duty cycle configuration information, e.g., that may have been selected by the gNB based on the UE's indication of its preferred BWP configuration, duty cycle, and duty cycle period.

When peak power and thermal constraints are both no longer applicable at a wireless device, the wireless device may indicate a default preferred duty cycle (e.g., up to 100%), and a default preferred BWP configuration (e.g., including the initial BWP assigned by the serving base station), to the serving base station, at least according to some embodiments. Alternatively, if desired, the wireless device may (e.g., at the time of requesting a preferred BWP configuration and/or duty cycle configuration) indicate to its serving base station a new timer to reflect the time duration for which the requested preferred configuration (BWP and duty cycle) is valid. Similar to previous parameters described herein, if desired, the timer value can be chosen as an index from a quantized set of values pre-configured by the base station (e.g., {1s, 5s, 10s, 30s}, as one possibility; any of various other sets are also possible). Alternatively, for any or all such parameters, numerical values may be used to indicate the preferences of the wireless device.

As previously noted, in some instances, peak-power mitigation timelines may commonly differ from thermal mitigation timelines. For example, peak-power conditions may, at least in some instances, require mitigation actions on a relatively short timeline, while mitigation actions over a relatively longer timeline may be acceptable for thermal conditions. Supporting the use of a $T_{duty\_cycle\_period}$ parameter may accordingly enable mitigation actions to be taken on a more appropriate timeline, e.g., depending on the type of condition in need of mitigation, at least according to some embodiments.

Figure 13:
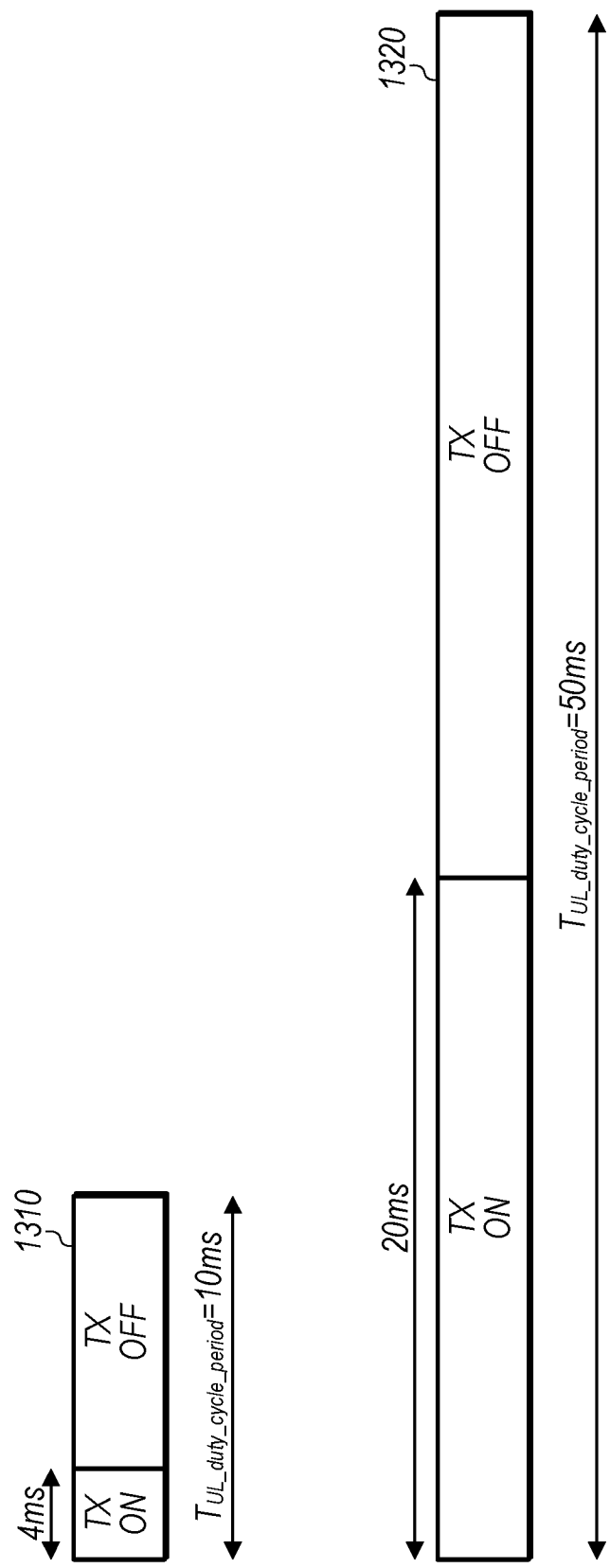

For example, consider the two possible transmitter use patterns that are illustrated in FIG. 13. Both duty cycle configurations have the same uplink duty cycle (40%), but the duty cycle periods differ between the configurations: in the upper illustrated transmitter use pattern 1310, $T_{duty\_cycle\_period}$=10 ms, while in the lower illustrated transmitter use pattern 1320, $T_{duty\_cycle\_period}$=50 ms.

The lower illustrated configuration 1320 may include a longer contiguous transmitter ON period, which may not be suitable for mitigating peak power constraints, as continuous transmission for an elongated period may potentially trigger a battery voltage brown-out condition due to high battery current drain. Thus, the upper illustrated configuration 1310 may be more suitable than the lower illustrated configuration 1320 for mitigating peak power constraints. Note that the lower illustrated configuration 1320 may be sufficient (and possibly even more beneficial, due to the potentially longer contiguous TX OFF period) to mitigate thermal constraints (e.g., in which a longer time constant is applicable), at least in some instances.

In the following further exemplary embodiments are provided.

One set of embodiments may include a method for a wireless device, comprising: establishing a radio resource control (RRC) connection with a cellular base station according to a first radio access technology (RAT); transmitting an indication of one or more of a preferred bandwidth part or a preferred communication duty cycle for the RRC connection to the cellular base station; and receiving an indication of one or more of a bandwidth part or a communication duty cycle selected for the RRC connection from the cellular base station.

Another set of embodiments may include a method for a cellular base station, comprising: establishing a radio resource control (RRC) connection with a wireless device according to a first radio access technology (RAT); receiving an indication of one or more of a preferred bandwidth part or a preferred communication duty cycle for the RRC connection from the wireless device; selecting one or more of a bandwidth part or a communication duty cycle for the RRC connection based at least in part on the indication of one or more of a preferred bandwidth part or a preferred communication duty cycle; and transmitting an indication of the selected bandwidth part and/or communication duty cycle for the RRC connection to the wireless device.

According to some embodiments, the method further comprises: the wireless device transmitting an indication of a preferred communication duty cycle period for the RRC connection to the cellular base station, wherein the indication of the preferred communication duty cycle period is provided in conjunction with the indication of the preferred communication duty cycle; the cellular base station selecting a communication duty cycle period for the RRC connection based at least in part on the indication of the preferred communication duty cycle period; and the cellular base station transmitting an indication of the selected communication duty cycle period to the wireless device.

According to some embodiments, an indication of a preferred communication duty cycle and a preferred communication duty cycle period are provided by the wireless device for each of uplink and downlink communication.

According to some embodiments, an indication of a preferred communication duty cycle and a preferred communication duty cycle period are provided by the wireless device for each active component carrier configured for the wireless device by the cellular base station.

According to some embodiments, an indication of a preferred bandwidth part is provided by the wireless device for each active component carrier configured for the wireless device by the cellular base station.

According to some embodiments, the method further comprises: the wireless device transmitting an indication of a preferred minimum time period for a contiguous gap with no downlink or uplink scheduling during each communication duty cycle period.

According to some embodiments, the method further comprises: the cellular base station providing an indication of a set of possible communication duty cycle values and a set of possible communication duty cycle period values, wherein the preferred communication duty cycle is selected by the wireless device from the set of possible communication duty cycle values, wherein the preferred communication duty cycle period is selected by the wireless device from the set of possible communication duty cycle period values.

According to some embodiments, one or more of the preferred bandwidth part, the preferred communication duty cycle, or the preferred communication duty cycle period are selected by the wireless device based at least in part on detecting that one or more of a thermal condition or a peak power condition is occurring at the wireless device.

According to some embodiments, the method further comprises: the wireless device determining that the thermal condition or peak power condition is no longer occurring at the wireless device; and the wireless device providing an indication of one or more of an updated preferred bandwidth part, an updated preferred communication duty cycle, or an updated preferred communication duty cycle period to the cellular base station based at least in part on determining that the thermal condition or peak power condition is no longer occurring at the wireless device.

According to some embodiments, the selected bandwidth part, communication duty cycle, and/or communication duty cycle period are configured to expire after expiration of a timer associated with the selected bandwidth part, communication duty cycle, and/or communication duty cycle period, wherein after expiration of the timer associated with the selected bandwidth part, communication duty cycle, and/or communication duty cycle period, the wireless device and the cellular base station communicate using a default bandwidth part, communication duty cycle, and/or communication duty cycle period for the RRC connection.

Another exemplary embodiment may include a device, comprising: an antenna; a radio coupled to the antenna; and a processing element operably coupled to the radio, wherein the device is configured to implement any or all parts of the preceding examples.

A yet further exemplary embodiment may include a non-transitory computer accessible memory medium comprising program instructions which, when executed at a device, cause the device to implement any or all parts of any of the preceding examples.

A still further exemplary embodiment may include a computer program comprising instructions for performing any or all parts of any of the preceding examples.

Yet another exemplary embodiment may include an apparatus comprising means for performing any or all of the elements of any of the preceding examples.

Still another exemplary embodiment may include an apparatus comprising a processing element configured to cause a wireless device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A wireless device, comprising:
an antenna;
a radio coupled to the antenna; and
a processor coupled to the radio;
wherein the wireless device is configured to:
establish a radio resource control (RRC) connection with a cellular base station according to a first radio access technology (RAT);
transmit an indication a preferred bandwidth part configuration for the RRC connection to the cellular base station, wherein the indication of the preferred bandwidth part configuration is for active component carriers configured for the wireless device by the cellular base station, wherein at least one active component carrier configured for the wireless device includes a plurality of bandwidth parts; and
receive an indication of a bandwidth part configuration selected for the RRC connection from the cellular base station.

2. The wireless device of claim 1, wherein the preferred bandwidth part configuration corresponds to a set of bandwidth sizes.

3. The wireless device of claim 1, wherein the bandwidth part configuration specifies a preferred bandwidth associated with at least one bandwidth part within one or more wideband cells.

4. The wireless device of claim 1, wherein the indication of the preferred bandwidth part configuration is comprised in a UEAssistanceInformation RRC message.

5. The wireless device of claim 1, wherein the indication of the preferred bandwidth part configuration is provided for each of downlink and uplink connection with the cellular base station.

6. The wireless device of claim 1, wherein the preferred bandwidth part configuration corresponds to one or more active bandwidth parts of the active component carriers.

7. The wireless device of claim 1, wherein the processor is further configured to:

transmit an indication of a preferred communication duty cycle for the RRC connection to the cellular base station; and receive an indication of a communication duty cycle selected for the RRC connection from the cellular base station.

8. An integrated circuit, comprising:
a processor, wherein the processor is configured to cause a wireless device to:
establish a radio resource control (RRC) connection with a cellular base station according to a first radio access technology (RAT);
transmit an indication a preferred bandwidth part configuration for the RRC connection to the cellular base station, wherein the indication of the preferred bandwidth part configuration is for active component carriers configured for the wireless device by the cellular base station, wherein at least one active component carrier configured for the wireless device includes a plurality of bandwidth parts; and
receive an indication of a bandwidth part configuration selected for the RRC connection from the cellular base station.

9. The integrated circuit of claim 8, wherein the preferred bandwidth part configuration corresponds to a set of bandwidth sizes.

10. The integrated circuit of claim 8, wherein the bandwidth part configuration specifies a preferred bandwidth associated with at least one bandwidth part within one or more wideband cells.

11. The integrated circuit of claim 8, wherein the indication of the preferred bandwidth part configuration is comprised in a UEAssistanceInformation RRC message.

12. The integrated circuit of claim 8, wherein the indication of the preferred bandwidth part configuration is provided for each of downlink and uplink connection with the cellular base station.

13. The integrated circuit of claim 8, wherein the preferred bandwidth part configuration corresponds to one or more active bandwidth parts of the active component carriers.

14. The integrated circuit of claim 8, wherein the processor is further configured to:

transmit an indication of a preferred communication duty cycle for the RRC connection to the cellular base station; and receive an indication of a communication duty cycle selected for the RRC connection from the cellular base station.

15. A non-transitory, computer accessible memory medium storing program instructions executable by a processor to:
establish a radio resource control (RRC) connection with a cellular base station according to a first radio access technology (RAT);
transmit an indication a preferred bandwidth part configuration for the RRC connection to the cellular base station, wherein the indication of the preferred bandwidth part configuration is for active component carriers configured for the wireless device by the cellular base station, wherein at least one active component carrier configured for the wireless device includes a plurality of bandwidth parts; and
receive an indication of a bandwidth part configuration selected for the RRC connection from the cellular base station.

16. The non-transitory, computer accessible memory medium of claim 15, wherein the preferred bandwidth part configuration corresponds to a set of bandwidth sizes.

17. The non-transitory, computer accessible memory medium of claim 15, wherein the bandwidth part configuration specifies a preferred bandwidth associated with at least one bandwidth part within one or more wideband cells.

18. The non-transitory, computer accessible memory medium of claim 15, wherein the indication of the preferred bandwidth part configuration is comprised in a UEAssistanceInformation RRC message.

19. The non-transitory, computer accessible memory medium of claim 15, wherein the indication of the preferred bandwidth part configuration is provided for each of downlink and uplink connection with the cellular base station.

20. The non-transitory, computer accessible memory medium of claim 15, wherein the preferred bandwidth part configuration corresponds to one or more active bandwidth parts of the active component carriers.

* * * * *